United States Patent
Diaz

(10) Patent No.: US 10,047,007 B2
(45) Date of Patent: Aug. 14, 2018

(54) FORMULATION BASED ON HYDRAULIC CEMENT ADDED WITH AMORPHOUS GLASSES AND MICRO-SPHERES FOR PRODUCTS OF REPAIR, MAINTENANCE OR REHABILITATION OF CONCRETE STRUCTURES

(71) Applicant: FRAWA PRODUCTOS PARA LA CONSTRUCCION, S.A. DE C.V., Naucalpan de Juarez, Edo. de Mexico (MX)

(72) Inventor: Jose Osawa Diaz, Naucalpan de Juarez (MX)

(73) Assignee: FRAWA PRODUCTOS PARA LA CONSTRUCCION, S.A. DE C.V., Naucalpan de Juárez, Edo. de México (MX)

( * ) Notice: Subject to any disclaimer, the term of this patent is extended or adjusted under 35 U.S.C. 154(b) by 0 days.

(21) Appl. No.: 15/432,076

(22) Filed: Feb. 14, 2017

(65) Prior Publication Data
US 2017/0313623 A1    Nov. 2, 2017

(30) Foreign Application Priority Data
Apr. 29, 2016 (MX) .................. MX/a/2016/005644

(51) Int. Cl.
| | |
|---|---|
| *C04B 14/22* | (2006.01) |
| *C04B 28/02* | (2006.01) |
| *C04B 14/06* | (2006.01) |
| *C04B 16/06* | (2006.01) |
| *C04B 111/72* | (2006.01) |
| *C04B 111/00* | (2006.01) |
| *C04B 103/00* | (2006.01) |

(52) U.S. Cl.
CPC .............. *C04B 14/22* (2013.01); *C04B 14/06* (2013.01); *C04B 16/06* (2013.01); *C04B 28/02* (2013.01); *C04B 2103/0042* (2013.01); *C04B 2111/00508* (2013.01); *C04B 2111/72* (2013.01)

(58) Field of Classification Search
CPC ......... C04B 14/06; C04B 14/22; C04B 16/06; C04B 28/02; C04B 2103/0042; C04B 2111/00508; C04B 2111/72
See application file for complete search history.

(56) References Cited

U.S. PATENT DOCUMENTS

| | | | |
|---|---|---|---|
| 3,823,021 A | 7/1974 | Jansen | |
| 6,626,991 B1* | 9/2003 | Drochon | C04B 28/02 106/672 |
| 6,966,945 B1* | 11/2005 | Mazany | C04B 28/006 106/600 |
| 7,174,962 B1* | 2/2007 | Roddy | C04B 28/021 106/672 |
| 7,335,252 B2 | 2/2008 | Roddy et al. | |
| 2007/0056476 A1* | 3/2007 | Roddy | C04B 28/04 106/707 |
| 2008/0149337 A1* | 6/2008 | Kulakofsky | C04B 28/02 166/292 |
| 2014/0047999 A1 | 2/2014 | Razl | |

FOREIGN PATENT DOCUMENTS

| | | |
|---|---|---|
| CN | 101628801 A | 1/2010 |
| CN | 103539391 A | 1/2014 |
| CN | 104724983 A | 6/2015 |

* cited by examiner

*Primary Examiner* — Anthony J Green
(74) *Attorney, Agent, or Firm* — Sughrue Mion, PLLC

(57) ABSTRACT

The present invention refers to a base formulation which serves to form a final product intended for the repair, maintenance or rehabilitation of concrete structures. Primarily, the base formulation contains cement in a percentage of 35% to 45% by weight of the final product. The base formulation also possesses amorphous glass in a proportion of 20% to 30% by weight of the final product, in ground from common glass, recycled glass or soda-lime glass. Finally, the base formulation may further possess solid quartz microspheres in a proportion of 10% to 20% by weight of the final product. This provides the final product with many desirable properties, such as high mechanical strength; high chemical resistance; easier application; easier ability to polish; prevents cold seals, leaving the final product thermally and dimensionally stable, among other desirable properties. The final products may include concrete correctors, waterproofing agents, coatings, among others.

16 Claims, 2 Drawing Sheets

FORMULATION BASED ON HYDRAULIC CEMENT ADDED WITH AMORPHOUS GLASSES AND MICRO-SPHERES FOR PRODUCTS OF REPAIR, MAINTENANCE OR REHABILITATION OF CONCRETE STRUCTURES

CROSS-REFERENCE TO RELATED APPLICATION

This application claims priority to Mexican Application No. MX/a/2016/005644 filed Apr. 29, 2016, the entirety of which is incorporated by reference.

FIELD OF THE INVENTION

The present invention relates to the technological field of construction products. Particularly, the invention refers to a hydraulic cement-based formulation that is combined with glass and microspheres, in order to obtain products for repair, maintenance or rehabilitation of concrete structures with improved, desirable properties.

BACKGROUND OF THE INVENTION

At present, concrete structures undergo degradation and erosion due to weather, climate and/or their use. This causes these structures to lose their original properties, requiring repair, maintenance or rehabilitation in order to maintain or recover their functionality. This problem affects both floors and walls and ceilings. Therefore, there is a range of products aimed at repair, maintenance or rehabilitation of concrete structures in the market.

For example, concrete correctors can repair cracks, fissures, or detaching concrete floors; while in roofs and walls they can be used for basic repairs, providing that they are not structural. There are some concrete corrective products that, in order to repair the affected area, need a prior application of a primer, a cement base product, and in some cases, a coating to make the surface more resistant. This procedure has a very high cost, requires a more complicated application process, and demands a lot of repair time. There are also many products made with cement and silica sand that are intended for repair in a single step; however, they do not achieve the same curing times, compression resistance, flexibility, durability, nor have a smooth finish. In addition, it should be noted that these products contain free silica that may cause silicosis and lung cancer, and therefore require the use of specialized respiratory masks for protection.

Furthermore, waterproofing products completely block the passage of water and can be applied to ceilings, floors and walls. In particular, they are used for the repair or construction of pools, cisterns and concrete-based reservoirs of water. They can be used both preventively and correctively. However, existing waterproofing agents are polymer-based, that comprise acrylic, vinyl, styrenated thermoplastic resins and copolymers thereof. These waterproofing materials contract and expand with changes in temperature, eventually forming cracks or fissures in the material, which means that the structures and waterproofing materials have to be replaced more frequently.

Finally, the coating can also be applied to ceilings, floors, and walls of concrete structures, which provides greater strength, durability and other characteristics depending on the specific product and use of the concrete structure. Notwithstanding the foregoing, traditional coatings are made with water-based paints. The paints only work well when they are not exposed to water. However, when there is water exposure, they do not offer sufficient durability and require reapplication frequently.

To address this type of technical problem, there are some formulations that seek to partially solve this particular problem. There have been attempts to include additives in the glass-based cement formulation. If the added glass is provided in amorphous form, then the formulation increases its resistance to movement, providing stronger and longer-lasting coatings. However, the application of the product to the surfaces is complicated. On the other hand, if hollow glass microspheres are added, the resulting formulation is lighter but loses compressive strength.

In this connection, there are some prior-art documents referring to the handling of this type of cement formulations. For example, U.S. Pat. No. 3,823,021 discloses an improved cement, which proposes the use of glass particles together with cement and silica. The glass particles proposed in that patent may vary, as ground or pulverized glass particles in a mesh size of 233 to 2.6 of soda-lime glass; or, alternatively like glass microspheres having a diameter of 1678 to 60 microns. The document does not provide for the use of both elements in combination. Therefore, the disadvantage of this invention is that the resulting formulation exhibits the problems discussed in the previous paragraph.

On the other hand, the U.S. patent application US20140047999 discloses a cementitious formulation resistant to acid corrosion and to high temperatures. This formulation defines a cementitious compound formed of several elements and a matrix, wherein the matrix may comprise hollow ceramic microspheres (cenospheres, a light fly-ash fraction) having a specific density of 0.3 to 0.8 g/cm3 and having a particle size of 10-600 microns, typically containing $SiO_2$ (56-64%) and $Al_2O_3$ (28-35%). In addition, the matrix is combined with porous recycled glass particles having various particle-sized grades of 8000 to 100 microns. The disadvantage of this document, as mentioned above, is that the addition of hollow glass microspheres results in a lighter formulation, which loses mechanical strength.

Also, patent applications in China address some of these uses as follows. Chinese patent application CN101628801A discloses a heat-insulating mortar, comprised of 8.99 to 15% recycled glass powder and 20 to 40% hollow glass microspheres, in addition to cement and additives. Chinese patent application CN103539391A discloses a waterproofing and heat insulation cement comprising of 8 to 10 parts by weight of recycled glass powder and 18 to 22 parts by weight of hollow glass microspheres, in addition to cement and additives. Chinese patent application CN104893694A discloses a light cement composed of 5 to 15 parts by weight of recycled glass powder having a variable size of 100 to 10 microns and 20 to 30 parts by weight of hollow glass microspheres, in addition to cement and additives. Chinese patent application CN104724983A discloses a different use for the manufacturing of fire-resistant bricks, the formulation of which comprises 4 to 6 parts by weight of recycled glass powder and 2 to 3 parts by weight of hollow glass microspheres, in addition to cement, additives and fibers. The main disadvantage of all these Chinese documents, as specified in previous paragraphs, is that the addition of hollow glass microspheres ultimately produces a lighter formulation, which results in a loss of mechanical strength.

Finally, U.S. Pat. No. 7,335,252 protects a composition which provides for the use of microspheres of any type, either solid or hollow, or a combination of both. The patent focuses on coating mixtures during oil well drilling operations, wherein the coating formulation must be fluid and light in order to be used as the main component for cementing the oil wells. Therefore, this document discloses neither the combination nor addition of the amorphous glass, which furthermore allows for the improvement of the mechanical strength of the structure.

Therefore, the prior art presents a need for a basic formulation that will serve the different products for repair, maintenance or rehabilitation of concrete structures, combining both a greater mechanical resistance and an easy application of the product to the surfaces. It is desirable for the products to have high adhesion to any surface; high compressive and flexural strength; low water absorption; be easy to apply and polish; have a non-cold seal; be resistant to chemicals, not exhibit fissures, and has dimensional and thermal stability in order to prevent contraction and dilation; and that can be sanded, pigmented or painted. Also, it is desirable for the products to be manufactured based on dry powders which make them easier to transport and apply.

SUMMARY OF THE INVENTION

An object of the present invention is to provide a cementitious base formulation that functions for different products for the repair, maintenance or rehabilitation of concrete structures.

Another object of the invention is that the base formulation provides better mechanical properties such as high adhesion, high compressive and flexural strength.

A third object of the invention is that the products of the base formulation are easy to apply to the surfaces and that they make polishing, sanding, pigmentation and/or painting easier.

A further object of the invention is that the applied products do not crack from the contraction and do not form a cold seal.

Another object of the invention is that the applied products have dimensional and thermal stability in order to prevent contraction and dilation, low water absorption, and resistance to corrosion due to chemicals.

One of the other objects of the present invention is that the additives of the base formulation do not affect the health of the workers that are in charge applying the product.

A final object of the invention is that the products are manufactured as dry powder-based, thus making them easier to transport and apply.

BRIEF DESCRIPTION OF THE DRAWINGS

To provide a better understanding of the tester device of the invention, the following drawings are appended.

DETAILED DESCRIPTION

Figure 1:
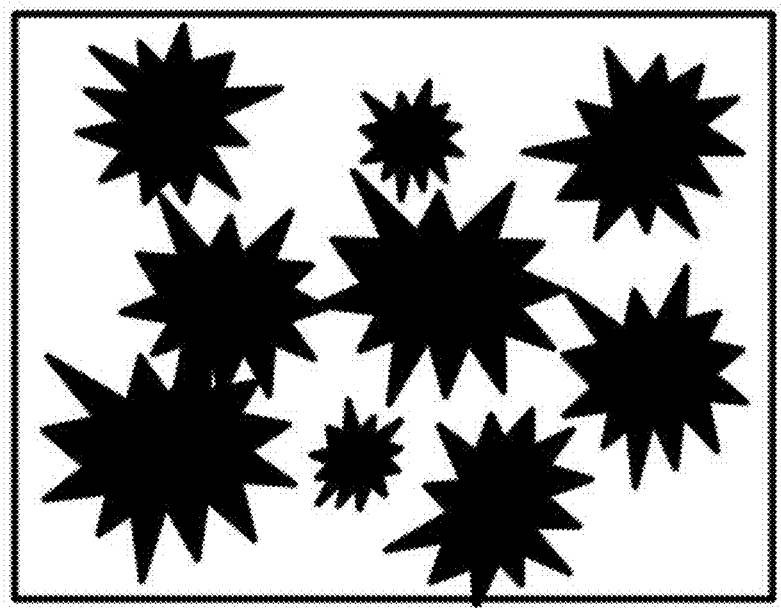
FIG. 1 corresponds to a graphical representation of the structure of a formulation based on hydraulic cement mixed with prior-art amorphous glasses.
Figure 2:
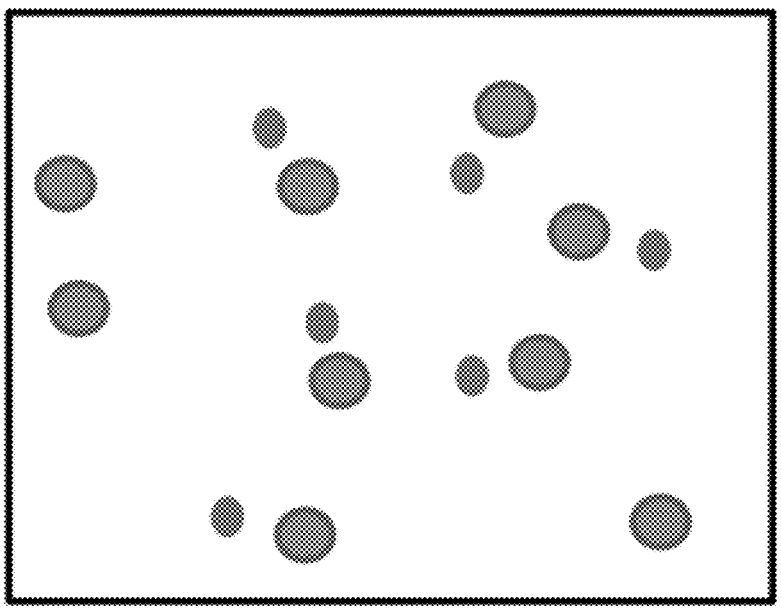
FIG. 2 corresponds to a graphical representation of the structure of a prior-art hydraulic cement-based formulation with microspheres.
Figure 3:
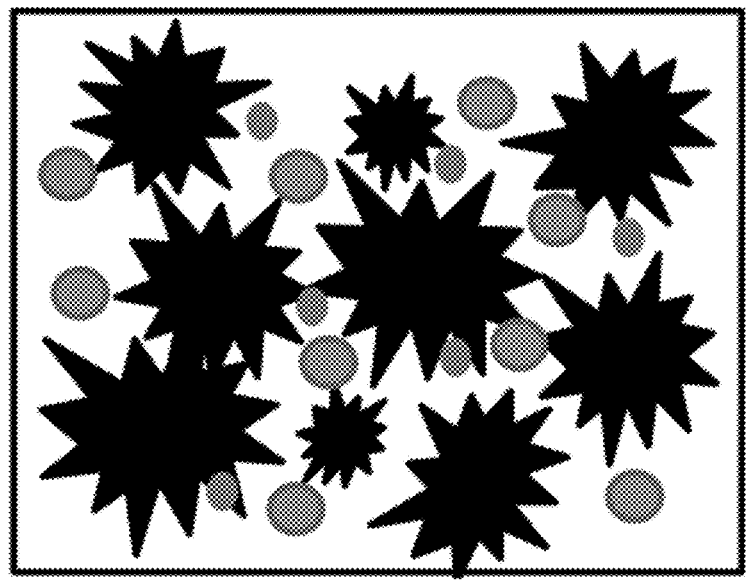
FIG. 3 corresponds to a graphical representation of the structure of a formulation based on hydraulic cement added with amorphous glasses and microspheres in accordance with the present invention.

The present invention will be described herein in accordance with a preferred embodiment and supported by the accompanying figures. FIGS. 1 and 2 are graphical representations of the structure of a hydraulic cement-based formulation combined with either amorphous glasses or crystals and with microspheres, respectively. In the representation of FIG. 1, it is observed that the glass is amorphous and if it moves, there will be a great resistance to such movement due to its irregular shape. Meanwhile, in FIG. 2, the presence of the spheres facilitates the interstitial movement of the cement-based mixtures. Also, it is known that microspheres, when hollow, can provide density reduction, thermal insulation and sound insulation properties. FIG. 3 demonstrates that the presence of solid spheres facilitates the movement of the glass and makes application much simpler, requiring less effort.

The present invention consists of a base formulation serving to produce a multitude of products for repair, maintenance or rehabilitation of concrete structures. These products may include concrete correctors, waterproofing, coatings, among others. The variation between one product and another is due to the combination of different additives for the formation of the final product. Therefore, variability between these and other products which utilize the base formulation is within the scope of the present invention.

Thus, the base formulation consists of a combination of hydraulic cement with amorphous glass or crystals and solid microspheres. In the preferred embodiment, the amorphous glass is crushed or milled from common glass, recycled glass or soda-lime glass. Preferably, the amorphous glass is used in a proportion of 20% to 30% by weight of the final product. Likewise, in the preferred embodiment, the solid microspheres are quartz. Preferably, the solid microspheres make up 10% to 20% by weight of the final product. Preferably, the remainder of the final product has cement from 35% to 45% by weight and additives from 1% to 5% by weight. Additionally, the final product may include polymeric fibers in proportions less than 1% by weight of the final product.

Now then, the particle size or granulometry of the amorphous glass and the solid microspheres is relevant to the invention, since its size variation produces an important synergistic effect. The variation in the size of the amorphous glasses allows a mechanical resistance, while the size variation of the solid microspheres allows them to settle into the interstitial spaces that form between the hydraulic cement and the amorphous glass, such as illustrated in FIG. 3. Thus, in the preferred embodiment, the range of amorphous glass is 180 microns or less. On the other hand, a first embodiment of the base formulation has a range of solid microspheres of 600 microns or less and a second embodiment of the base formulation has a range of solid microspheres of 180 microns or less. Thus, the first embodiment is primarily used in concrete corrective and waterproofing products, while the second embodiment is mainly used in the coating product where the final product can form films less than 1 mm thick.

Moreover, the percentage distribution of grain size or granulometry is relevant, since a predominant size of each component adequately achieves the combined effect. In an exemplary embodiment, the percentage distribution of the particle size of the amorphous glasses is outlined in Table 1 below:

TABLE 1

Distribution of granulometry of amorphous glass in an exemplary embodiment.

| Granulometry (Microns) | % of distribution |
| --- | --- |
| 180 | 2.56% |
| 150 | 3.98% |
| 125 | 9.66% |
| 90 | 15.63% |
| 63 | 11.08% |
| 45 | 4.93% |
| <45 | 52.19% |

In turn, Table 2 below illustrates the percentage distribution of the granulometry of the solid microspheres for the first embodiment:

TABLE 2

Distribution of granulometry of solid microspheres in the first embodiment.

| Granulometry (Microns) | % of distribution |
| --- | --- |
| 600 | 20.00% |
| 300 | 4.38% |
| 180 | 5.78% |
| 125 | 30.73% |
| 105 | 10.93% |
| 90 | 9.93% |
| 75 | 5.97% |
| 63 | 6.04% |
| 53 | 2.36% |
| 45 | 1.92% |
| <45 | 1.98% |

Finally, Table 3 below demonstrates the percentage distribution of the granulometry of the solid microspheres for the second embodiment:

TABLE 3

Distribution of granulometry of microspheres in the second embodiment.

| Granulometry (Microns) | % of distribution |
| --- | --- |
| 180 | 6.88% |
| 125 | 40.98% |
| 105 | 14.57% |
| 90 | 13.24% |
| 75 | 7.95% |
| 63 | 8.05% |
| 53 | 3.14% |
| 45 | 2.56% |
| <45 | 2.63% |

Figure 4:
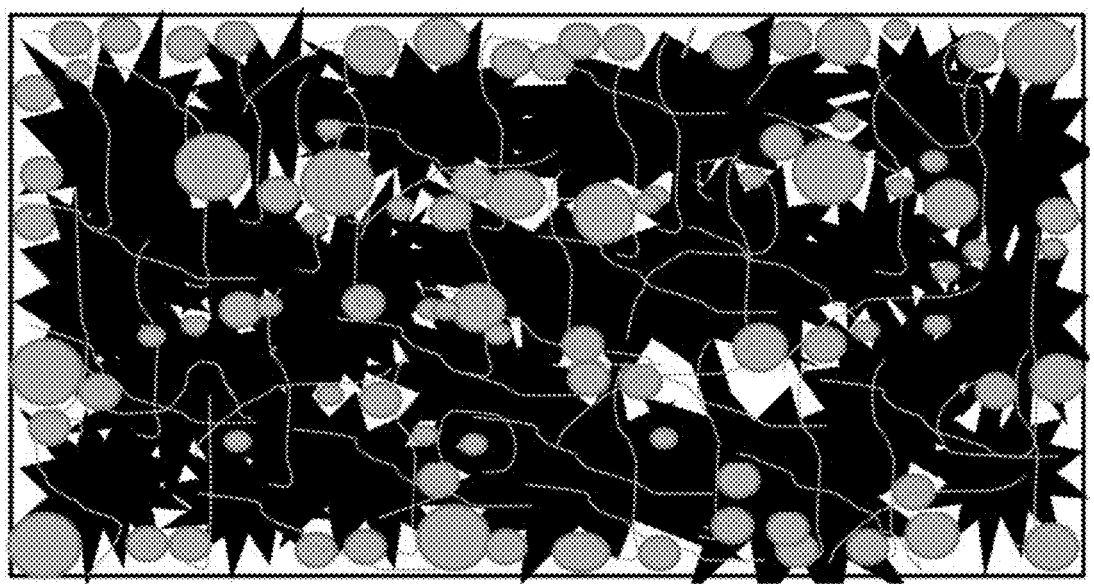
FIG. 4 corresponds to a graphical representation of the structure of the final product formed with the formulation based on hydraulic cement, mixed with amorphous glasses and microspheres in accordance with the present invention.

According to FIG. 4, a graphic representation of a finished final product can be observed, which includes in its composition the base formulation. In the representation, different amorphous glasses, microspheres and additives such as fibers can be observed. As already explained above, with the different sizes and distributions in both the amorphous glasses and crystals as well as in the solid quartz microspheres the formulation of the present invention enables the interstitial spaces to be optimally sealed off. In addition, the fibers present in the final product enable the bonding of the elements, increasing flexural strength. The fiber content and characteristics of the fiber that will be used in the different final products will also depend on the use for which it is intended.

In another final product, the cement may comprise fast-curing cement with a smaller particle size than normal cement. This type of fast-curing cement works very well with the base formulation object of the present invention since instead of using aggregates such as gravel and sands, soda-lime glass and microspheres of different granulometries are used to better seal the spaces, additives and fibers.

As mentioned above, solutions that exist in the market contain some of the components that are mentioned individually, such as fast-curing cement or fiber; however, none of them use soda-lime glasses or quartz microspheres. These give the present solution unique properties, such as: high mechanical strength, high chemical resistance, ease of application and polishing of the resulting surface, as well as sealing the spaces with microspheres, which is what allows the final product to have a very low water absorption and therefore have a minimum permeability to it. In turn, this technology does not form a cold seal (as long as the proper procedure is used to scarify the surface) of the products with the old surfaces, allowing perfect adhesion between the two and ensuring that the selected product meets the desired characteristics depending on the desired use of the surface. The replacement of the aggregates normally used in the glass building industry is beneficial since it does not cause significant changes in the density of the concrete. This is because the glass has a density of the same order as the commonly used aggregates, depending on their production characteristics. In addition, it has a very low water absorption and does not exhibit crystalline silica since it was processed prior for the preparation of the glasses. Like glass, the quartz microspheres are free of crystalline silica and because they make up a substantial percentage of 10% to 20%, they reduce the risk of contracting any illnesses that may be caused by overexposure or continuous use of this material.

Based on the foregoing disclosure, certain embodiments and details have been described in order to illustrate the present invention, and it will be apparent to those skilled in the art that variations and modifications may be made without departing from the scope of the present invention.

What is claimed is:

1. A base formulation that serves to form a final product aimed at the repair, maintenance or rehabilitation of concrete structures, the base formulation comprising:
   cement in a percentage of 35% to 45% by weight of the final product;
   amorphous glasses in a percentage of 20% to 30% by weight of the final product, and
   solid quartz microspheres in a percentage of 10% to 20% by weight of the final product.

2. The base formulation according to the claim 1, wherein the amorphous glass is ground from common glass, recycled glass or soda-lime glass.

3. The base formulation according to claim 1, wherein the amorphous glass comprises soda-lime glass.

4. The base formulation according to claim 1, wherein the final product contains additives from 1% to 5% by weight.

5. The base formulation according to claim 1, wherein the final product may include polymeric fibers in proportions less than 1% by weight.

6. The base formulation according to claim 1, wherein the size range of the amorphous glass is 180 microns or less.

7. The base formulation according to claim 6, wherein the size of the amorphous glass is distributed such that:
   particles of 180 microns comprise 2.56%,
   particles of 150 microns comprise 3.98%,
   particles of 125 microns comprise 9.66%,
   particles of 90 microns comprise 15.63%,
   particles of 63 microns comprise 11.08%, particles of 45 microns comprise 4.93%, and
particles smaller than 45 microns comprise 52.19%.

8. The base formulation according to claim 1, wherein the size range of solid microspheres is 600 microns or less.

9. The base formulation according to claim 8, wherein the final product is a concrete corrector or a waterproofing agent.

10. The base formulation according to claim 8, wherein the size of solid microspheres is distributed such that:
particles of 600 microns comprise 20.00%,
particles of 300 microns comprise 4.38%,
particles of 180 microns comprise 5.78%,
particles of 125 microns comprise 30.73%,
particles of 105 microns comprise 10.93%,
particles of 90 microns comprise 9.93%,
particles of 75 microns comprise 5.97%,
particles of 63 microns comprise 6.04%,
particles of 53 microns comprise 2.36%,
particles of 45 microns comprise 1.92%, and
particles smaller than 45 microns comprise 1.98%.

11. The base formulation according to claim 1, wherein the size range of solid microspheres is 180 microns or less.

12. The base formulation according to claim 11, wherein the final product is a coating.

13. The base formulation according to claim 12, wherein the coating may form layers less than 1 mm thick.

14. The base formulation according to claim 11, wherein the size of solid microspheres is distributed such that:
particles of 180 microns comprise 6.88%,
particles of 125 microns comprise 40.98%,
particles of 105 microns comprise 14.57%,
particles of 90 microns comprise 13.24%,
particles of 75 microns comprise 7.95%,
particles of 63 microns comprise 8.05%,
particles of 53 microns comprise 3.14%,
particles of 45 microns comprise 2.56% and
particles smaller than 45 microns comprise 2.63%.

15. The base formulation according to claim 1, further comprising fibers that increase flexural strength of the final product.

16. The base formulation according to claim 1, wherein the cement may comprise fast-curing cement.

* * * * *